United States Patent [19]

Gill et al.

[11] Patent Number: 4,543,946

[45] Date of Patent: Oct. 1, 1985

[54] NONTRACKING PARABOLIC SOLAR ENERGY COLLECTOR APPARATUS

[75] Inventors: Michael Gill, Sugarland; Mark C. Rogers, Baytown, both of Tex.

[73] Assignee: Advanced Solar Systems, Midland, Tex.

[21] Appl. No.: 640,068

[22] Filed: Aug. 13, 1984

Related U.S. Application Data

[63] Continuation-in-part of Ser. No. 476,176, Mar. 17, 1983, Pat. No. 4,475,537, which is a continuation of Ser. No. 324,516, Nov. 24, 1981, abandoned, which is a continuation of Ser. No. 48,448, Jun. 14, 1979, abandoned.

[51] Int. Cl.⁴ .................................................. F24J 3/02
[52] U.S. Cl. ...................................... 126/438; 350/625
[58] Field of Search ............... 126/438, 439, 443, 442, 126/448, 417, 450; 136/89; 350/293

[56] References Cited

U.S. PATENT DOCUMENTS

| | | | |
|---|---|---|---|
| 3,049,055 | 8/1962 | Tubbs | 126/438 |
| 3,866,285 | 2/1975 | Clark | 126/438 X |
| 3,987,781 | 10/1976 | Nozik et al. | 126/438 X |
| 4,134,392 | 1/1979 | Livermore et al. | 126/439 |
| 4,142,514 | 3/1979 | Newton | 126/438 |
| 4,153,042 | 5/1979 | Tragert | 126/441 |

Primary Examiner—Randall L. Green
Attorney, Agent, or Firm—Edwin E. Greigg

[57] ABSTRACT

A mirror collector having a generally parabolic surface terminating near the vertex in a circular or cylindrical curve, an evacuated cylindrical heat entrapment tube composed of a clear glass for energy admission and an elongated, U-shaped heat collector tube centrally located in the heat entrapment tube for passing an inner fluid to be heated. The U-shaped tube is constructed of copper with a selective absorption coating for receiving heat and positioned so that the mirror collector concentrates substantially all incoming energy upon the central heat collector tube for providing a concentration factor of about four (4).

8 Claims, 3 Drawing Figures

U.S. Patent   Oct. 1, 1985   4,543,946
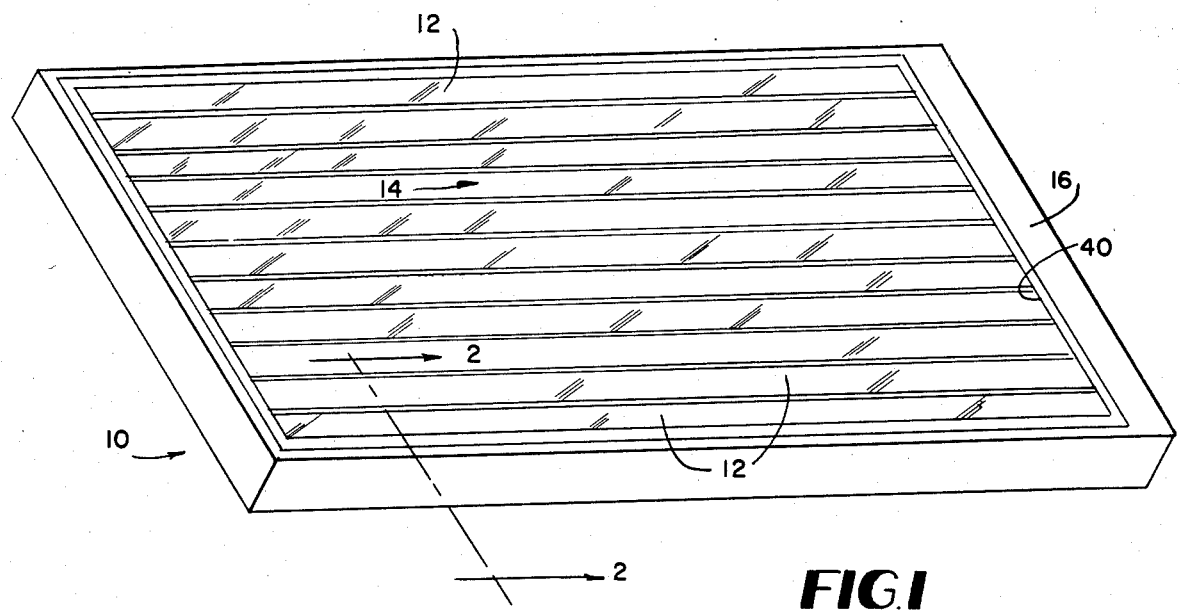
FIG.1
FIG.2
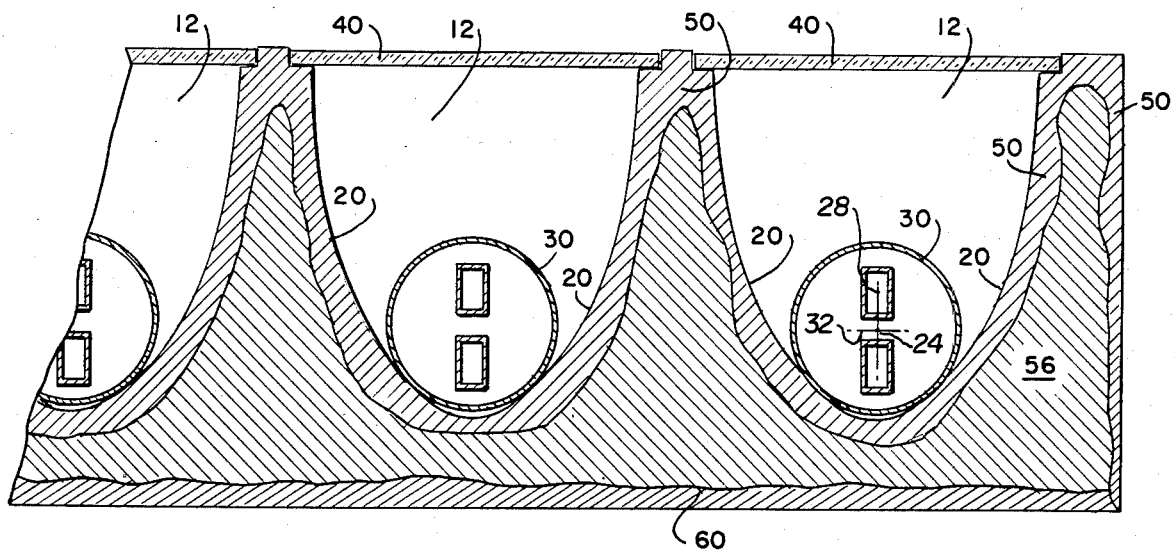
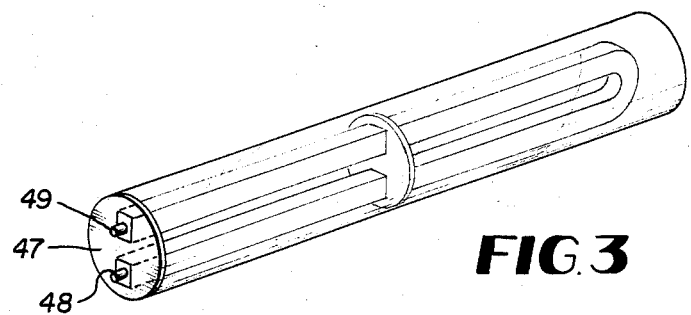
FIG.3

NONTRACKING PARABOLIC SOLAR ENERGY COLLECTOR APPARATUS

CROSS REFERENCE TO RELATED APPLICATION

This application is a continuation-in-part of U.S. patent application Ser. No. 476,176 filed Mar. 17, 1983, now U.S. Pat. No.4,475,437, which is a continuation of Ser. No. 324,516 filed Nov. 24, 1981, now abandoned, which is a continuation of U.S. patent application Ser. No. 48,448 filed June 14, 1979, now abandoned.

BRIEF SUMMARY OF THE INVENTION

The present invention relates to and describes the operating principles and fabrication of a nontracking compound parabolic solar collector. More particularly it relates to structure in which there are three main parts to the collector, (a) the mirror itself, (b) the heat collector tube, and (c) the solid state controller. Each are constructed and discussed arranged with respect to new operation, results, structural uses and improvements not heretofore apparently known.

A mirror design, (a) above, of the collector is based on the ability of a parabolic surface to concentrate all incoming radiation onto its focal point. This particular mirror is comprised of two identical parabolic sections rotated symmetrically off the optical axis of the collection trough. This parabolic curve is continuous to within about three degrees (3°) of the exact center of the trough at which point it seemingly degenerates to a circular curve. The focal point of each side of the curve is a point in the opposite side about one-half inch (½") above the bottom and about one-quarter inch (¼") from the vertical center line of the curve. Thus a focal plane is created about one-half inch (½") from the bottom of the curve. By nesting a U-shaped, rectangular tube measuring about 0.531 by 0.10 inch in the focal plane of the mirrors, all incoming energy will be concentrated onto the surface of the U-shaped tube.

The fabrication of the mirror structure is a lamination of various densities of polymerized concrete. A negative mold of the curve is covered with thin aluminum sheet. Next, a high-density, quick-set plastic polymer and concrete mixture shown in actual composition in Table 'A' below and here identified as "Type A" is sprayed on in a layer three-eighths inch (⅜") thick and allowed to set. Next, the mold is filled with low-density concrete fiberglass and glass bead aggregate shown in actual composition in Table 'B' below and here identified as "Type B", and allowed to dry. Finally, a cover layer of polymerized concrete shown in actual composition in Table 'C' below and here identified as "Type C" is sprayed on to form a damage and moisture resistant exterior surface. Once removed from the mold, the panel is fitted with the collector tubes, headers and low-iron glass cover plates.

A heat entrapment tube, (b) above, is composed of a clear glass for energy admission and to protect the inner fluid U-shaped tube. The inner U-shaped copper tube is generally rectangular in shape and secured centrally along the axis of the heat entrapment tube and formed with a selective absorption coating to receive heat. This assembly is installed in the trough where inlet and outlet headers are attached. The mirror concentrates all incoming energy on the centrally located tube giving a concentration factor of about four (4). The outer tube maintains even heat distribution and refocuses energy radiated from even heat distribution and refocuses energy radiated from the fluid tube.

A microprocessor-based digital controller, (c) above, operates the system by constantly monitoring the hot and cold holding tank temperatures, the collector temperatures, and all tank levels. The controller is also connected through buffer stages to solenoid valves, relays for pump motor starters, and automatic switching to a backup system. By the addition of living area thermostats, sensors for outside temperature, and solar energy insulation, a complete automatic system provides improved functions using new structures and achieving new uses not previously known.

FIELD OF THE INVENTION

The purpose, advantage and feature of the invention is that is provides a concentrating solar collecting panel or panels constructed upon more or less a parabolic curve comprised of two identical halves made to approximate a straight parabolic curve and then which are arranged in mating relation to resemble a parabolic curve, each half of the trough composed of a paraboloid essentially and in which the bottom of the trough has disposed therein in nesting relation a circular or tubular collecting element or tube that will actually have heat absorbing fluid passing through it such as hydrocarbon or silicon fluids as well as any available super high temperature responsive fluid used in industrial applications. The axis of the circular heat entrapment tube coalesces generally with a line formed by the focal point of the parabolic curves so that there is essentially created a focal plane disposed within the circular heat entrapment tube. The curve comprising the parabolic surface is about 2–3 degrees off center at the bottom of the curve, and the contour of the curve may be computed plotted so that it achieves maximized focusing in the contour shaped structure of each half. The circular heat entrapment tube may be of glass having its diameter about 1½ inches, and its center coalesces or coincides with the line of focal points. Inside the circular heat entrapment tube there is a U-shaped tube formed by parallel rectangular tubes joined at one end by a U-turn bend and made of metal or copper that actually has the working fluid passing through it and is supported within the circular heat entrapment tube by conventional means. The interior surface of the circular heat entrapment tube is coated with a material for retroflecting or reflecting back into the tube all infrared radiation so that it is not lost into the parabolic surface and back out of the trough.

SUMMARY OF THE INVENTION

The object and objects of the invention are that it provides a new, improved and effective nontracking parabolic collector of solar energy.

A further object of the invention is to provide a combination of a collector tube, a parabolic mirror surface and a metallic or copper tube of a configuration disposed at the focal point of the surface and receiving the energy that is transferred into heat received by a high energy work fluid so that it is carried to a heat exchange unit by a header.

A further object of the invention is to provide a fabrication of a mirror structure of lamination of various substances so that it is long enduring while in situ and provides maximized efficiency of heat exchange from the solar energy to a high temperature responsive exchange of energy from solar energy to heat so that the heat can be processed in a heat exchange unit.

A further object of the present invention is to provide a collector tube composed of a clear glass outer tube for energy admission and in which an inner U-shaped tube of metal of generally rectangular cross section has a selective absorption coating for receiving heat and through which there passes a high heat responsive material sensitive to solar energy received therein and for conveying the heat to a heat exchange unit. The heat entrapment tube of glass may have its inner surface with or without a separate coating thereon for retroreflecting infrared and other forms of heat back onto the inner tube so that no heat is lost from the trough to its exterior after having been received for collection therein.

A further object of the invention is to provide an outer tube that maintains an even heat distribution and for refocusing energy radiated from the inner and fluid containing tube from the collector cylinder tube onto the inner tube.

BRIEF DESCRIPTION OF THE SEVERAL VIEWS OF THE DRAWINGS

The above and other objects and advantages of the invention will become apparent upon full consideration of the following detailed description and accompanying drawings in which:

FIG. 1 is a generally perspective view of the non-tracking compound parabolic solar collectors forming a unit according to a preferred embodiment of the present invention;

FIG. 2 is a cross sectional view taken along lines 2—2 of FIG. 1, but on an enlarged scale and showing features and details of the preferred embodiment of the invention; and FIG. 3 is a perspective view of the U-shaped tube assembled in the heat entrapment tube.

DETAILED DESCRIPTION OF THE PREFERRED EMBODIMENT

Referring now to the drawings there is shown a solar energy collection apparatus 10 for providing nontracking parabolic collection of solar energy and including a series of troughs 12, 12, 12 arranged in an array 14 disposed in a manifold and support structure 16 forming an integral unit as shown in FIG. 1.

The troughs 12, 12 are shown in more particular detail by the cross sectional arrangement of FIG. 2 which is taken along line 2—2 of FIG. 1 described above. The troughs are comprised of mating half sections for example of two identical parabolic sections 20, 20 formed by being rotated symmetrically off an optical axis of the collection trough. The parabolic curve of each of the troughs is continuous to within two or three degrees of an exact center of the trough at which point the curve may degenerate into a circular curve at the bottom, as shown toward the peripheral edge of the curve. The focal point 24 of each of the curves is at a general point as shown and is about, in the preferred embodiment, ¾ inch above the bottom curvature of the trough 12 and is also found to be about ¼ inch from the vertical center line 28 of the curve or half section. Thus a focal plane is created proximate ¾ inch from the bottom of the curve and about ¼ inch either side of a vertical center line thereof. There is then inserted into the trough in nesting relation a heat entrapment cylindrical tube 30 of glass and which extends throughout the length of the trough, the cylinder having an axis 32 that generally and approximately coincides with the line of focal points 24 extending throughout the trough. The heat entrapment tube may be of any transparent material such as glass described above, and its inner surface may be coated with material for providing infrared light to be retroreflected back into the cylinder if it is not collected as will be described below. The trough in it conventional operation collects solar energy throughout is parabolic surface that passes within the trough and through a glass cover plate 40 so that it is directed toward the focal point 24, but should it pass through that point to the other side of the cylinder 30, it will not exhaust the confines of the cylinder but will be relected back into the cylinder 30 due to the cylindrical inner surface.

Mounted within the central portion of the cylinder 30 is a U-shaped metallic tube that is approximately the length of the heat entrapment tube 30 and may be of rectangular shape in cross section, the axis of the U-shaped metallic tube 46 having its central point or axis encompassing both the line of focal points 24 and the axis 32 of the cylinder 30, and so constructed for the conveyance of a working fluid passing therethrough. The working fluid is a hydrocarbon or a silicone mixture or any material of a super high temperature sensitive and responsive material so that upon impact of solar energy rays, the working fluid increases and absorbs heat and its temperature is correspondingly raised in response thereto for conveying the absorbed heat from the trough to a heat exchange unit (not shown). Each rectangular tube of the U-shaped tube connected to a round tube at the end which is brought out of the front of the heat entrapment tube through an end plate 47 which is sealed to the glass tube and sealed along the inlet 48 and outlet 49 of the U-shaped tube. The inlet and outlets are secured to other inlets and outlets of the collector to form a continuous header.

The parabolic surfaces 20, 20 may be formed of a mirror parabolic structure and to provide sufficient support thereof there is a lamination of various densities polymerized concrete on its rear surface as shown in FIG. 2. The set of parabolic surfaces 20, 20 form a mold of the parabolic curve and is coated on its mirror surface with a thin aluminum sheet. Then a high-density, quickset plastic polymer and concrete mixture 50 is spray-coated onto the parabolic surface 20, 20, to a depth of about ⅜ inches in thickness and is allowed to set. After the mixture 50 is allowed to harden, it is comprised of a mold that is filled with low-density concrete fiberglass and glass bead aggregate 56 and is allowed to dry to a hardened state. At the conclusion of this step then a cover layer of polymerized concrete 60 forms a base structure and upon hardening it is then removed, forming the panel that is inserted into the manifold and support equipment frame 16 described in FIG. 1 together with being fitted out with the heat entrapment tubes and cylinders 30, headers, and the low-iron glass cover plate 40.

It is seen that the heat entrapment tube is comprised of a clear, transparent glass or similar material for energy transmission or admission therein and for supporting the U-shaped tube centrally disposed therein. The U-shaped inner tube is constructed generally of metal or copper having a vertical major axis with selectively disposed absorption coating for the reception of heat and preventing heat from passing through the U-shaped tube. This assembly is installed in the trough where inlet and outlet headers are attached to inlet 48 and outlet 49, respectively. The mirror of the parabolic surface concentrates all incoming energy on the center tube giving a concentration factor of about four. The outer tube of cylindrical construction provides evenly distributed heat and distribution that provides essentially and resultantly refocuses energy radiated from the fluid tube. The outer heat entrapment tube is evacuted and the end 47 is sealed to prevent vacuum leakage.

Tables of material referred to above include the following details and tables A, B and C inclusive as follows:

TABLE 'A'

| Compound "Type A" | Ratios by Volume (Approximate) |
|---|---|
| Water | 1 Part |
| Ropflex | 1 Part |
| Portland | 2 Parts |

TABLE 'B'

| Compound "Type B" | Ratios by Volume (Approximate) |
|---|---|
| Water | 1 Part |
| Ropflex | ½ Part |
| Portland Cement | 2 Parts |
| Glass Beads | 4 Parts |

TABLE 'C'

| Compound "Type C" | Ratios by Volume (Approximate) |
|---|---|
| Water | 1 Part |
| Ropflex | 2 Parts |
| Portland Cement | 3 Parts |
| Fiberglass chopped during spraying application | |

ROPFLEX is a tradename of Rohm and Haas for water-based, acrylic polymer, found similar to that used in commercial paint products of Sears, Roebuck and Co., under the tradename Sears Best.

Also within the broad and general concept of the invention there is seen to be provided a microprocessor-based digital controller for operating the system which constantly monitors the hot and cold holding tank temperatures, the collector temperatures, and all tank levels. A controller is also capable of being provided and connected through buffer stages to solenoid valves, relays for pump motor starters and automatic switching to a backup system. By the addition of living area thermostats, sensors for outside temperature and solar energy insulation, a complete and thoroughly automatic and automated system is available for use within the purview of the present invention.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed and desired to be secured by Letters Patent of the United States is:

1. A solar energy collection apparatus comprising:
    a support;
    at least one trough in the support, said at least one trough having an internal reflective surface comprising two oppositely disposed truncated parabolic sections rotated away from its vertical axis to create a wide angle of acceptance opening, and a reflective circular face joining the ends of said two parabolic sections which are opposite said acceptance opening, said reflective surface being molded with said support, said internal reflective surface having a focal line to which said internal reflective surface reflects incident solar energy;
    a heat entrapment tube formed of glass which is vacuum sealed and nested in said at least one trough and extending substantially along the focal line of said reflective surface such that a portion of the trough engages the heat entrapment tube therein which permits thermal expansion of said collector cylinder; and
    a U-shaped metallic tube mounted within said heat entrapment tube for conducting a heat absorption material therethrough for collecting heat from incident solar energy.

2. A solar energy collection apparatus as defined in claim 1, wherein the U-shaped metallic tube contains a working fluid for the transfer of solar energy.

3. A solar energy collection apparatus as defined in claim 2, wherein the internal reflective surface comprises in part a thin aluminum sheet molded to the support.

4. A solar energy collection apparatus as defined in claim 3, wherein the heat entrapment tube engages the two parabolic surfaces such that the heat entrapment tube is spaced from the circular face.

5. A solar energy collection apparatus as defined in claim 4, wherein the U-shaped metallic tube is coated with a radiation absorption material to facilitate heat reception by the working fluid and said heat entrapment tube is coated on its inner surface with an infrared reflective material.

6. A solar energy collection apparatus as defined in claim 5, also having a low-iron glass plate secured to cover each of the troughs opposite the circular face.

7. A solar energy collection apparatus as claimed in claim 1, in which;
    said U-shaped metallic tube is formed by rectangular sections connected at one end by a U-shaped bend and aligned along the focal line of said reflective surface.

8. A solar energy collection apparatus as claimed in claim 6, in which;
    said U-shaped metallic tube has an inlet and outlet at the same end of said heat entrapment tube.

\* \* \* \* \*